United States Patent [19]
Rilling

[11] Patent Number: 6,142,014
[45] Date of Patent: *Nov. 7, 2000

[54] DEVICE FOR MEASURING THE MASS OF A FLOWING MEDIUM OF AIR ASPIRATED BY AN INTERNAL COMBUSTION ENGINE

[75] Inventor: Heinz Rilling, Eberdingen, Germany

[73] Assignee: Robert Bosch GmbH, Stuttgart, Germany

[ * ] Notice: This patent is subject to a terminal disclaimer.

[21] Appl. No.: 09/101,634

[22] PCT Filed: Aug. 29, 1997

[86] PCT No.: PCT/DE97/01934

§ 371 Date: Jul. 14, 1998

§ 102(e) Date: Jul. 14, 1998

[87] PCT Pub. No.: WO98/21554

PCT Pub. Date: May 22, 1998

[30] Foreign Application Priority Data

Nov. 14, 1996 [DE] Germany .......................... 196 47 086

[51] Int. Cl.[7] ....................................................... G01F 1/68
[52] U.S. Cl. ........................................................ 73/204.21
[58] Field of Search ............................. 73/204.21, 118.2, 73/202.5, 202

[56] References Cited

U.S. PATENT DOCUMENTS

| | | | |
|---|---|---|---|
| 3,683,692 | 8/1972 | Lafitte | 73/202.5 |
| 4,412,449 | 11/1983 | Eiermann et al. | 73/204.21 |
| 4,986,116 | 1/1991 | Usui et al. | 73/118.2 |
| 5,253,517 | 10/1993 | Molin et al. | 73/118.2 |
| 5,918,279 | 6/1999 | Hetch et al. | 73/204.21 |

*Primary Examiner*—Harshad Patel
*Attorney, Agent, or Firm*—Ronald E. Greigg; Edwin E. Greigg

[57] ABSTRACT

Known devices for measuring the mass of a flowing medium, or flow rate meters, have a measurement element accommodated in a measurement stub, and a flow rectifier with a grid is provided upstream of the measurement element. For easy production and assembly and accurate alignment of a grid (21) with a flow rectifier (20) of the device (1), the grid (21) has integrally formed-on spring elements (30), which deform elastically when the flow rectifier (20) is installed so that by their spring force, in combination with a detent connection (33, 35) provided on the flow rectifier (20), they durably retain the flow rectifier (20) and the grid (21). The device is intended for measuring the mass of a flowing medium, especially for measuring the flow rate of air aspirated by internal combustion engines.

13 Claims, 3 Drawing Sheets

DEVICE FOR MEASURING THE MASS OF A FLOWING MEDIUM OF AIR ASPIRATED BY AN INTERNAL COMBUSTION ENGINE

PRIOR ART

The invention is based on a device for measuring the mass of a flowing medium, or flow rate meter, for air aspirated by an internal combustion engine. A device is already known (European Patent 0 458 998) that has a measurement element accommodated in a measurement stub, with a flow rectifier and a grid accommodated upstream of the measurement element. The flow rectifier is intended to generate as uniform a flow as possible over the entire inside cross section. The grid, durably secured in the flow rectifier, is intended to create superfine eddies in the flow, so that the flow conditions downstream of the grid can be made as constant as possible for the sake of stabilizing the measurement signal. To avoid a deviation from the characteristic curve of the measurement signal output by the measurement element, it is especially important that the grid be disposed in a precise alignment with the flow rectifier. This is done, in the known device, by embedding the grid in the heated state in a ring of the flow rectifier. The grid is a wire grid, which has individual wires woven together into a grid structure. The wires can still shift somewhat relative to one another. Embedding the wire grid in the plastic has the disadvantage that if there is a temperature change, and when the plastic of the flow rectifier ages, creepage can cause sagging of the wire grid. However, the sagging of the wire grid causes shifting among the individual wires of the grid, and as a consequence the characteristic curve the measurement element is disadvantageously altered. Because the grid is permanently secured to the flow rectifier, there is also the disadvantage that only relatively complicated and expensive flow rectifiers with grids of different mesh widths can be combined with one another. There is also the danger that plastic forced out when the grid is embedded in the heated state in the ring of the flow rectifier will remain behind in the flow rectifier, thus putting obstacles in the way of the flow which can lead to signal deviation, especially under mass-production conditions. Moreover, the intended embodiment of a ring, which protrudes from a surface of the flow rectifier that is disposed perpendicular to the flow, is relatively complicated to produce.

ADVANTAGES OF THE INVENTION

The device according to the invention for measuring the mass of a flowing medium, has the advantage over the prior art that flow rectifiers with a grid of differing mesh width or with different opening cross sections can be produced in an especially simple way. A particular advantage is that the production and assembly of the device are especially simple. It is especially advantageous that sagging of the grid can be averted, and consequently the accuracy and especially the stability of measurement in long-term operation of the device are increased.

By the provisions recited, advantageous refinements of and improvements to the device are attainable.

It is advantageous that grids of different mesh widths or different opening cross sections can be produced without entailing any special tooling expense. In addition, for an intended dismantling of the device, the flow rectifier and the grid are present individually, and thus can easily be separated for recycling. The mode of production of the grid by stamping is especially advantageous; it is thus possible to produce the opening cross sections of the grid with high accuracy, without increasing the production costs of the grid.

BRIEF DESCRIPTION OF THE DRAWINGS

An exemplary embodiment of the invention is shown in simplified form in the drawings and described in further detail below.

DESCRIPTION OF THE EXEMPLARY EMBODIMENT

Figure 1:
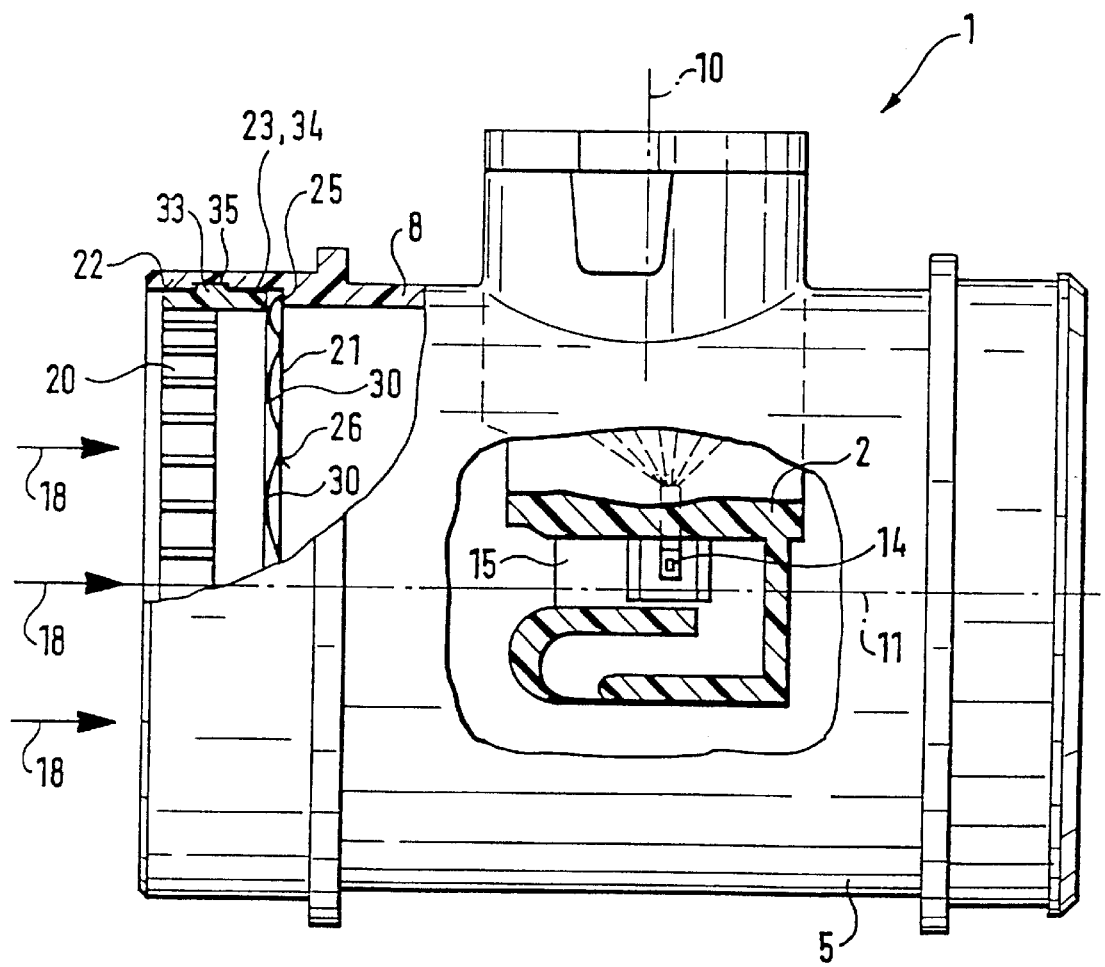
FIG. 1 is a fragmentary sectional view of the device of the invention.

In FIG. 1, a device 1 for measuring the mass of a flowing medium, or flow rate meter, especially for measuring the flow rate of the air aspirated by internal combustion engines, is shown. The engine may be a mixture-compressing engine with externally supplied ignition, or an air-compressing engine with self-ignition. The device 1 has a measurement part 2, which is introduced, for instance in plug-in fashion, into a measurement stub 5 of the device 1. The measurement part 2 is by way of example slender, rodlike, and parallel-epiped in shape, extending in elongated fashion in the direction of a plug-in shaft 10, and is introduced, for instance in plug-in fashion, into an opening made in a wall 8 of the measurement stub 5. The wall 8 defines a flow cross section, for example of circular cross section, in the middle of which a center axis 11 extends, this axis being oriented in the direction 18 of the flowing medium, parallel to the wall 8, and perpendicular to the plug-in shaft 10. The direction of the flowing medium is indicated by arrows 18 in FIG. 1, in which it extends from left to right.

A measurement element 14 is introduced with the measurement part 2 into the flowing medium. A measurement conduit 15 is formed in the measurement part 2 of the device 1, and the measurement element 14 for measuring the medium flowing in the measurement stub 5 is accommodated in this conduit. The construction of such a measurement part 2 with a measurement element 14 is well known to one skilled in the art, for instance from German Published, Non-Examined Patent Application DE-OS 44 07 209, whose disclosure is hereby expressly incorporated by reference.

Upstream of the measurement element 14, a flow rectifier 20 and a grid 21 are provided. The flow rectifier 20 comprises plastic and is produced by injection molding, for example. The grid 21 provided downstream of the flow rectifier 20 comprises a slow-reacting metal, such as special steel.

For assembly, the grid 21 is introduced into an opening 23, for instance circular in shape, provided on the upstream end of the measurement stub 5, until it rests with its back face on a stop 25 that reduces the cross section of the opening 23. Next, the flow rectifier 20 can be inserted into the opening 23, until it rests on spring elements 30 provided on the grid 21 and facing in an axial direction. For durable securing of the flow rectifier 20 in the opening 23, the flow rectifier 20 has barblike detent hooks 33, protruding radially outward somewhat past its outer face 22, which can lock into an encompassing groove 35 provided in an inner wall 34 of the opening 23. When the flow rectifier 20 is introduced into the opening 23, the spring elements 30 of the grid 21 are deformed elastically and exert an axially oriented spring force on the flow rectifier 20. When the installation position of the flow rectifier 20 in the opening 23 is reached, the detent hooks snap into place in the groove 35 and, with the aid of the spring force of the spring elements 30, retain the flow rectifier 20 and the grid 21 durably with axial tension. A detent ring extending all the way around the circumference of the flow rectifier 20 may also serve as the detent hook 33. The spring elements 30 can not only be embodied on the grid 21 in such a way that they rest on the flow rectifier 20, but can also rest on the stop 25, or else they can rest on the flow rectifier 20 and on the stop 25 in alternation.

Figure 2:
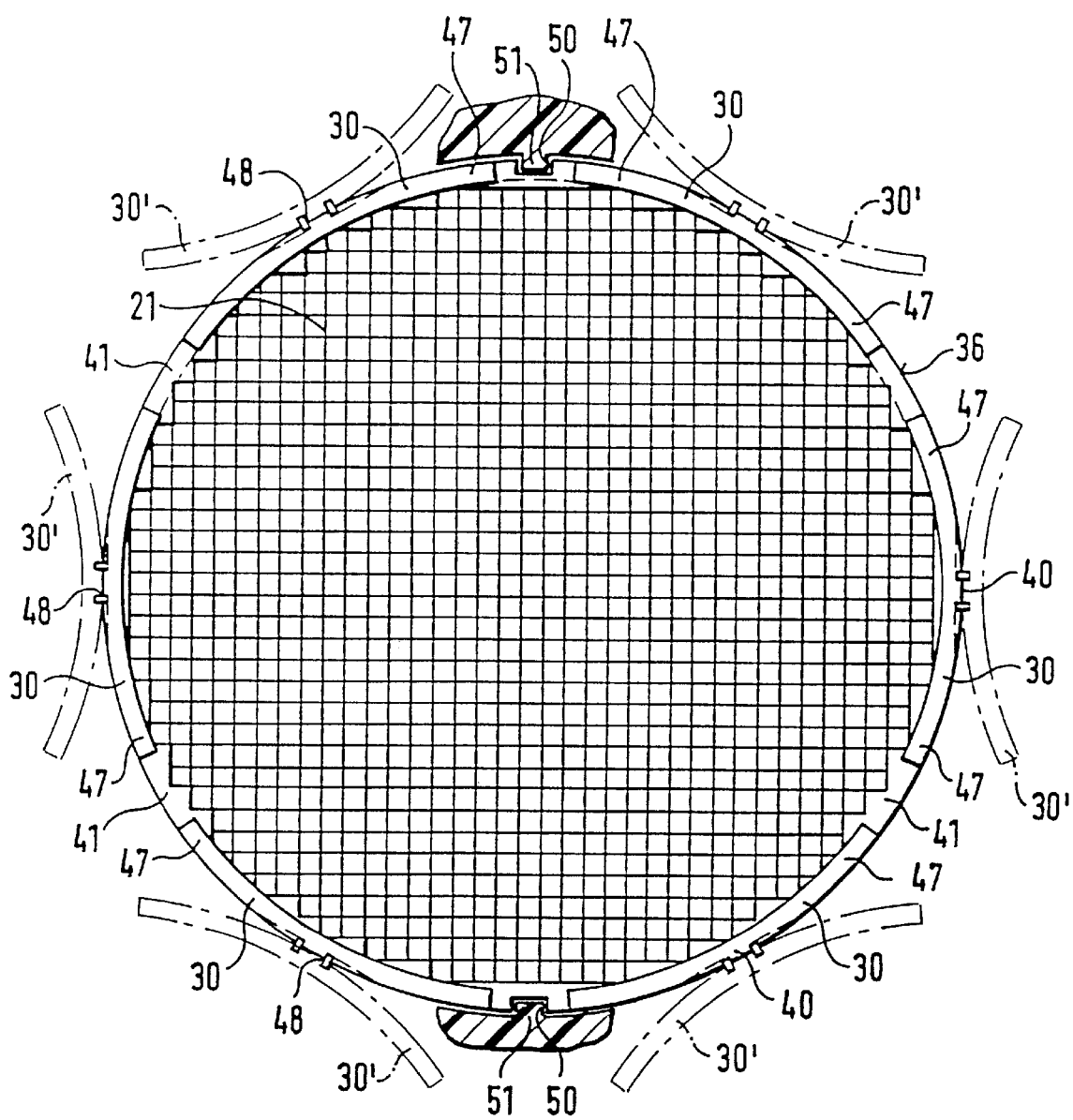
FIG. 2 is a plan view on a grid of the device.
Figure 3:
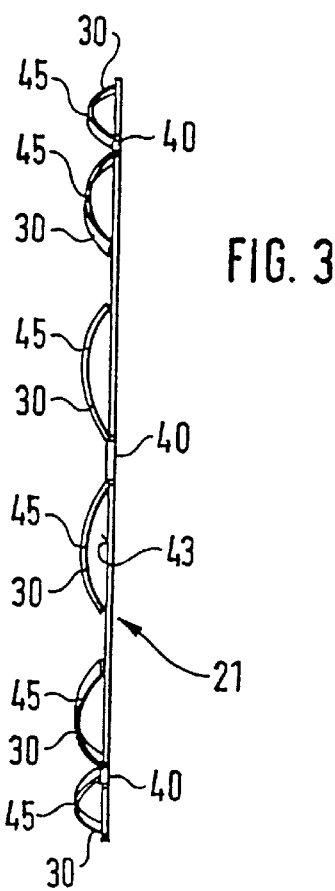
FIG. 3 is a side view of the grid of FIG. 2.

As shown in further detail in FIG. 2, which is a plan view on the grid 21, the grid 21 has, for instance, six spring elements 30. The spring elements are integrally embodied on the grid 21 and are preferably produced, like the grid 21, by being stamped out of a metal strip. After the stamping, the spring elements 30' have the circular-annular form indicated by a dot-dashed line in FIG. 2. The spring elements 30' represented by the dot-dashed line are joined to an outer annular region 41 of the grid 21 only via a narrow connecting region 40 provided on an outer edge 36 of the grid 21. By means of a bending tool, not shown in detail here, the spring elements 30 are first bent in barrette-like fashion, on both sides of the connecting regions 40, into a curved shape, and after that each spring element 30 has, for instance, two humps 45 of equal size. After that, the spring elements 30 are bent approximately 180° toward the grid 21, around the connecting region 40, so that in their final state they rest in some segments on the annular region 41, which is defined by the outer edge 36 of the grid 21 and surrounds the actual grid structure. As shown further in FIG. 3, which is a side view of the grid of FIG. 2, with their humps 45, which can be elastically deformed, the spring elements 30 protrude away from a plane 43 of the grid 21 that is defined by the grid 21. As shown in FIG. 2, between two ends toward one another of two spring elements 30, a spacing in the circumferential direction remains, which decreases accordingly upon an elastic deformation of the spring elements 30 toward the grid 21.

Figure 4:
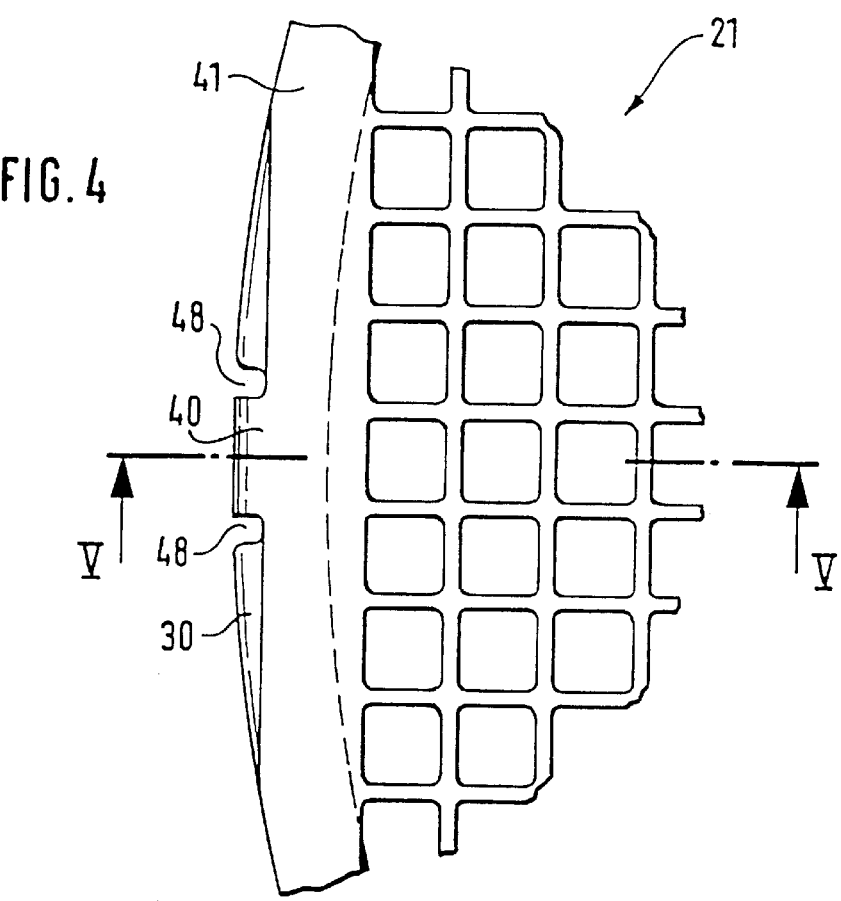
FIG. 4 is a detail, on a larger scale, of the grid of FIG. 2.
Figure 5:
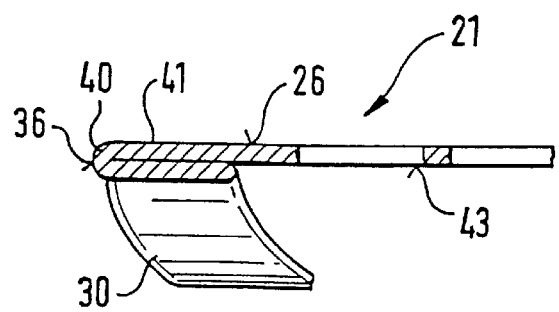
FIG. 5 is a fragmentary sectional view of the grid taken along a line V—V in FIG. 4.

As shown in FIG. 4, which is a detail of FIG. 2 on a different scale, two notches 48 per spring element 30 are provided, one on each side of the connecting region 40. The notches 48 make it possible, after the grid 21 has been stamped out, for the spring elements 30', which are shown in FIG. 2 in dot-dashed lines before being bent over, to be bent over without developing cracks and without wasting material. The grid 21 also has opposed centering recesses 50, for instance rectangular in shape, which are shown in FIG. 2 and extend radially inward from the outer edge 36, and which can be engaged by ribs 50 provided in the opening 23, so that when the grid 21 is being installed a precise installed position relative to the flow rectifier 20 can be obtained.

Located on the downstream end of the measurement stub 5 is a guard grid, not shown in detail, which is intended to guard the measurement part 2 against mechanical effects, such as direct contact with the hand. It is manufactured with such a wide mesh that it does not significantly influence either the accuracy of measurement by the measurement element 14 nor the air flow rate.

The foregoing relates to preferred exemplary embodiments of the invention, it being understood that other variants and embodiments thereof are possible within the spirit and scope of the invention, the latter being defined by the appended claims.

What is claimed is:

1. A device for measuring the mass of a flowing medium, comprising a measurement element accommodated in a measurement stub and having a flow rectifier, and a grid, provided upstream of the measurement element, the arid (21) has spring elements (30) integrally formed thereon, which are designed to be elastically deformable and exert an axial spring tension on the grid (21) and the flow rectifier (20).

2. The device according to claim 1, in which the spring elements (30) have a circular-annular shape.

3. The device according to claim 1, in which the spring elements (30) are located in some segments in an annular region (41) that defines an outer edge (36) of the grid (21).

4. The device according to claim 3, in which on two sides of a connection region (40), the spring elements (30), curved in barrette-like fashion, protrude from a grid plane (43) defined by the grid (21).

5. The device according to claim 4, in which each spring element (30) has one hump (45) on each of the two sides of the connecting region (40).

6. The device according to claim 1, in which the spring elements (30) protrude from a grid plane (43) of the grid (21) that is defined by the grid (21).

7. The device according to claim 6, in which the spring elements (30) are bound to the grid (21) only via a narrow connecting region (40) on an outer edge (36) of the grid (21), and are bent toward the grid (21) at this connecting region (40).

8. The device according to claim 1, in which the spring elements (30) are bound to the grid (21) only via a narrow connecting region (40) on an outer edge (36) of the grid (21), and are bent toward the grid (21) at this connecting region (40).

9. The device according to claim 1, in which on two sides of a connection region (40), the spring elements (30), curved in barrette-like fashion, protrude from a grid plane (43) defined by the grid (21).

10. The device according to claim 9, in which each spring element (30) has one hump (45) on each of the two sides of the connecting region (40).

11. The device according to claim 1, in which the grid (21) and the spring elements (30) are produced in one piece by being stamped out from a thin strip of metal.

12. The device according to claim 1, in which the flow rectifier (20) is retained by means of a detent connection (33, 35) in an opening (23) of the measurement stub (5), and the spring elements (30) of the grid (21), by elastically deforming, exert a spring force for retaining the flow rectifier (20) and the grid (21) in the opening (23) of the measurement stub (5).

13. The device according to claim 12, in which the spring elements (30) of the grid (21) rest on the flow rectifier (20).

* * * * *